UNITED STATES PATENT OFFICE.

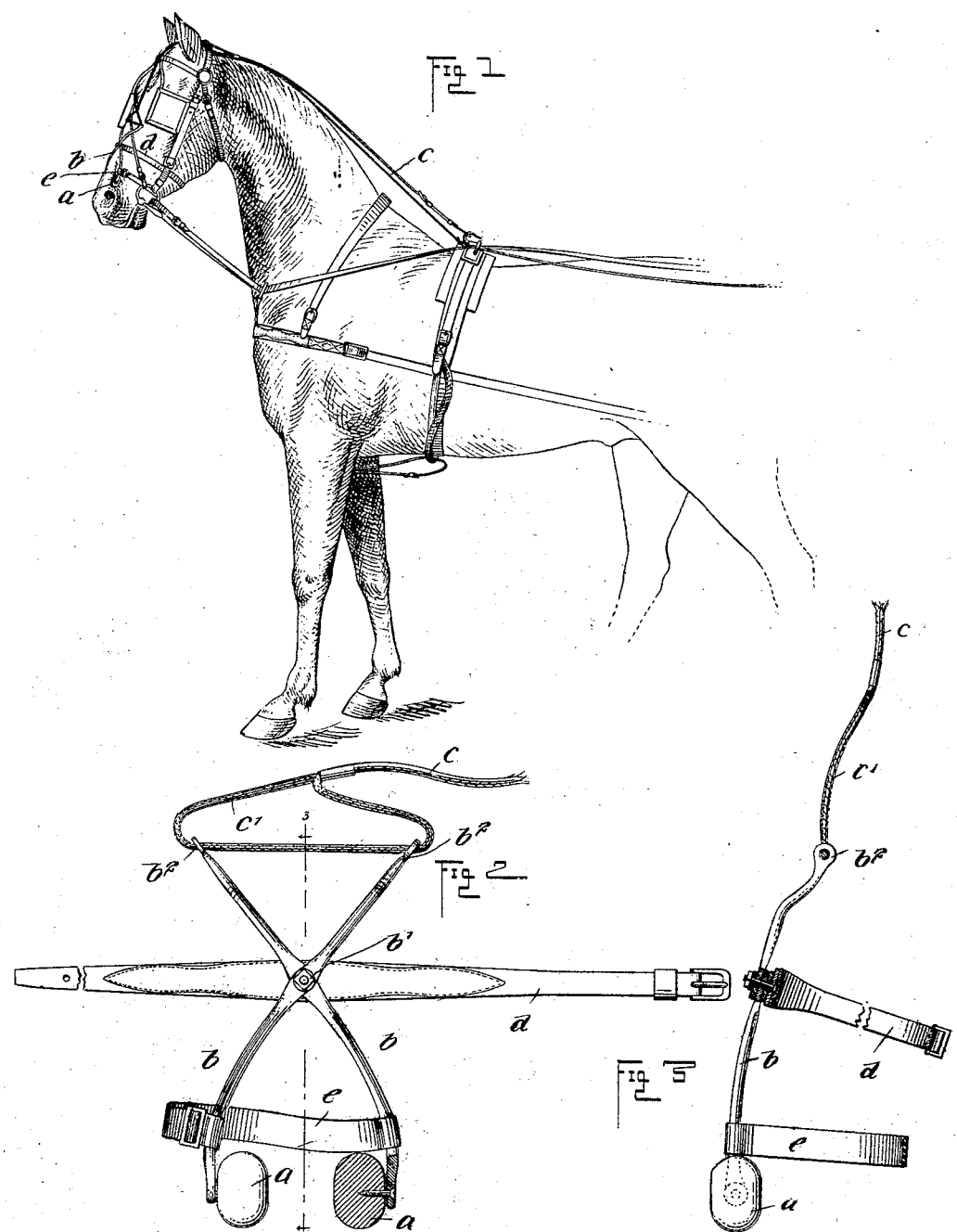

SAMUEL S. STEWART, OF HICKSVILLE, NEW YORK.

MEANS FOR RESTRAINING HORSES.

SPECIFICATION forming part of Letters Patent No. 689,696, dated December 24, 1901.

Application filed August 17, 1901. Serial No. 72,422. (No model.)

*To all whom it may concern:*

Be it known that I, SAMUEL S. STEWART, a citizen of the United States, and a resident of Hicksville, in the county of Nassau and State of New York, have invented a new and Improved Horse-Check, of which the following is a full, clear, and exact description.

This invention relates to a device for arresting runaway horses; and it comprises two knobs arranged to be pressed against the nostrils of a horse to throttle it.

This specification is a specific description of one form of the invention, while the claims are definitions of the actual scope thereof.

Reference is to be had to the accompanying drawings, forming a part of this specification, in which similar characters of reference indicate corresponding parts in all the views.

Figure 1 is a view showing the invention in use. Fig. 2 is a plan view thereof, and Fig. 3 is a section on the line 3 3 of Fig. 2.

$a$ represents the knobs, which may be constructed of wood, metal, or other material, as desired, and which are preferably of ovate form. These knobs are fastened to levers $b$, which cross each other and are pivoted together at the point $b'$. The upper ends of the levers $b$ have eyes $b^2$ therein, through which is passed the loop $c'$ of a cord or strap $c$. This strap extends backward over the top of the horse's head and back to the vehicle to which the horse is attached, suitable guide devices being provided for holding the strap in place both at the top of the head and at the gig-saddle.

$d$ indicates a strap which is fastened to the levers $b$ at the point $b'$ and which passes around the head of the horse, as indicated in Fig. 1, and $e$ indicates a second strap, preferably elastic, this strap passing under the chin of the horse.

In applying the device the parts are arranged as in Fig. 1, so that the knobs $a$ bear against the nose of the horse just above the nostrils. By drawing on the cord $c$ the loop $c'$ causes the upper ends of the levers $b$ to be drawn together. This moves together the lower ends of the levers and presses the knobs $a$ against the horse, thus closing the wind-passages and effectively throttling the animal.

Various changes in the form, proportions, and minor details of my invention may be resorted to without departing from the spirit and scope of my invention. Hence I consider myself entitled to all such variations as may lie within the scope of my claims.

Having thus described my invention, I claim as new and desire to secure by Letters Patent—

1. A horse-check, comprising two knobs adapted to lie on opposite sides of the nose of a horse, levers to which the knobs are attached, said levers lying on the front of the head of the horse and being crossed and pivoted together, a strap adapted to encircle the head of the horse and having the pivot-pin of the levers fastened thereto, and means for swinging the levers on their pivot, for the purpose specified.

2. A horse-check, comprising two knobs adapted to lie on opposite sides of the nose of a horse, levers to which the knobs are attached, said levers being crossed and pivoted together, a cord having a loop therein slidably engaged with the levers, a strap adapted to be fastened to the head of the horse and carrying the pivot-pin of the levers, and a second strap connected with the levers adjacent to the knobs, said latter strap passing under the chin of the horse.

In testimony whereof I have signed my name to this specification in the presence of two subscribing witnesses.

SAMUEL S. STEWART.

Witnesses:
 I. B. OWENS,
 JNO. M. RITTER.